(12) United States Patent
Short

(10) Patent No.: US 10,532,544 B2
(45) Date of Patent: Jan. 14, 2020

(54) WEATHER RESISTANT THERMOFORMED ARTICLES

(71) Applicant: Premier Material Concepts LLC, Findlay, OH (US)

(72) Inventor: Eric D. Short, Findlay, OH (US)

(73) Assignee: PREMIER MATERIAL CONCEPTS, LLC, Findlay, OH (US)

( * ) Notice: Subject to any disclaimer, the term of this patent is extended or adjusted under 35 U.S.C. 154(b) by 0 days.

(21) Appl. No.: 15/910,171

(22) Filed: Mar. 2, 2018

(65) Prior Publication Data
US 2019/0077126 A1    Mar. 14, 2019

Related U.S. Application Data

(60) Provisional application No. 62/556,699, filed on Sep. 11, 2017.

(51) Int. Cl.
| | |
|---|---|
| *B32B 27/08* | (2006.01) |
| *B32B 27/32* | (2006.01) |
| *B32B 27/20* | (2006.01) |
| *B29C 48/16* | (2019.01) |
| *B29C 48/00* | (2019.01) |

(52) U.S. Cl.
CPC .............. *B32B 27/08* (2013.01); *B29C 48/16* (2019.02); *B32B 27/20* (2013.01); *B32B 27/32* (2013.01); *B29C 48/022* (2019.02); *B32B 2250/02* (2013.01); *B32B 2250/03* (2013.01); *B32B 2250/40* (2013.01); *B32B 2262/101* (2013.01); *B32B 2262/106* (2013.01); *B32B 2274/00* (2013.01); *B32B 2307/406* (2013.01); *B32B 2307/712* (2013.01); *B32B 2307/738* (2013.01);
(Continued)

(58) Field of Classification Search
CPC ......... B32B 27/08; B32B 27/20; B32B 27/32; B32B 2274/00; B32B 2262/101; B32B 2323/10; B32B 2323/04; B32B 2307/406; B32B 2262/106; B32B 2307/738; B32B 2250/40; B32B 2250/03; B32B 2250/02; B32B 2307/712; B29C 48/16; B29C 48/022
See application file for complete search history.

(56) References Cited

U.S. PATENT DOCUMENTS

| | | | | |
|---|---|---|---|---|
| 4,842,951 A | * | 6/1989 | Yamada | .................. B32B 27/08 428/516 |
| 5,298,335 A | * | 3/1994 | Reed | ...................... D21H 19/62 427/391 |

(Continued)

*Primary Examiner* — David Sample
*Assistant Examiner* — Donald M Flores, Jr.
(74) *Attorney, Agent, or Firm* — Shumaker, Loop & Kendrick, LLP; James D. Miller

(57) ABSTRACT

An article formed in a co-extrusion process comprises a base layer and a first cap layer disposed on the base layer. The base layer is formed from a thermoplastic olefin comprising a thermoplastic polymer, an elastomer, and a base filler. The base layer comprises greater than 15% by weight of the base filler. The first cap layer comprises at least one polyolefin and between 0-15% by weight of a first cap filler. The first cap layer has a thickness less than a thickness of the base layer. The first cap layer is configured to provide an exterior surface of the article resistant to whitening or fading caused by exposure to the ambient environment in comparison to the underlying base layer.

18 Claims, 3 Drawing Sheets

(52) U.S. Cl.
CPC ....... *B32B 2323/04* (2013.01); *B32B 2323/10* (2013.01)

(56) References Cited

U.S. PATENT DOCUMENTS

| | | | | |
|---|---|---|---|---|
| 5,667,872 | A | * | 9/1997 | Ohno ................ B32B 27/32 428/141 |
| 5,712,023 | A | * | 1/1998 | Nakajima ........... B32B 27/20 428/195.1 |
| 6,306,518 | B1 | * | 10/2001 | Shah ................. B32B 27/32 428/516 |
| 6,489,019 | B1 | * | 12/2002 | Shah ................. B32B 27/32 428/325 |

\* cited by examiner

WEATHER RESISTANT THERMOFORMED ARTICLES

CROSS-REFERENCE TO RELATED APPLICATIONS

This application claims priority to U.S. Provisional Patent Application Ser. No. 62/556,699 filed Sep. 11, 2017, the entire disclosure of which is hereby incorporated herein by reference.

FIELD OF THE INVENTION

The present technology relates to a multi-layered thermoplastic article resistant to appearance defects and whitening.

BACKGROUND

Thermoplastic olefin (TPO) is a multiphase composition in which one phase includes a material that is hard and stiff at room temperature and fluid when heated and another phase that includes an elastomeric material that is soft and rubberlike at room temperature. Various blends of materials can be included in the TPO, where typically there are portions of a thermoplastic polymer, an elastomer, and a filler to provide rigidity. TPOs can be designed to be tough and durable and can be tailored to meet specific application requirements such as being weather-resistant, paintable, scratch-resistant, and presenting low odor and low temperature ductility, among other options. Other notable aspects of TPOs include chemical resistance and the ability to be recycled. TPO is used in various applications, including automotive, building and construction, and other industrial applications. Particular examples of TPO articles include automotive components including bumpers, interior and exterior trim, floor mats, grips, and seals.

Respective portions of thermoplastic polymer, elastomer, and filler can be tailored to provide certain properties depending on the application. Examples of thermoplastic polymers include polypropylene (PP), polyethylene (PE), and/or block copolymer polypropylene (BCPP), among others. Examples of elastomers include ethylene propylene rubber (EPR), EPDM (EP-diene rubber), ethylene-octene (EO), ethylbenzene (EB), and/or styrene ethylene butadiene styrene (SEBS), among others. Examples of fillers include talc, calcium carbonate, fiberglass, carbon fiber, wollastonite, and/or MOS (Metal Oxy Sulfate), among others. Depending upon the type of filler used, characteristics of the resulting TPO can be modified to enhance strength, scratch resistance, impact resistance, and weight, among other characteristics. TPO can be processed by injection molding, profile and sheet extrusion, and thermoforming.

Certain TPO articles can exhibit undesirable weathering and changes in appearance such as loss of color fastness and gloss changes following extended exposure to the ambient environment. It has been discovered that such appearance changes are typically due to ultraviolet (UV) radiation exposure, and hence, such TPO articles may be produced to include a sufficient amount of UV stabilizers. However, in other circumstances, it has been found that certain TPO articles, and especially TPO articles produced using a thermoforming process, exhibit an appearance of premature wear or fade that results in the appearance of whitening on an exposed surface of the TPO articles. Such whitening effects occur even when the TPO articles include sufficient UV stabilizers.

Accordingly, it would be advantageous to provide a TPO article that maintains a surface finish, including particular gloss and color retention characteristics, where the TPO article is resistant to weathering and premature whitening, even when the article is the product of thermoforming.

SUMMARY OF THE INVENTION

The present technology includes articles of manufacture, systems, and methods of making such that relate to polymer and thermoplastic polyolefin layers that maintain a desired aesthetic appearance, including gloss and color or white fastness, while resisting premature weathering and whitening thereof.

According to one embodiment of the current invention, an article comprises a base layer formed from a first material. The first material comprises greater than 15% by weight of a base filler. The article further comprises a first cap layer disposed on the base layer. The first cap layer is formed from a second material comprising between 0-15% by weight of a first cap filler.

According to another embodiment of the invention, an article comprises a base layer formed from a thermoplastic olefin comprising a thermoplastic polymer, an elastomer, and a base filler. The base layer comprises greater than 15% by weight of the base filler. The base layer has a first thickness. The article further comprises a first cap layer disposed on the base layer. The first cap layer comprises a polyolefin and between 0-15% by weight of a first cap filler. The first cap layer has a second thickness less than the first thickness. The base layer and the first cap layer are formed in a co-extrusion process.

The invention also includes a method of manufacturing an article. The method comprises the step of co-extruding a base layer and a first cap layer to form a laminated sheet, the base layer formed from a first material comprising greater than 15% by weight of a base filler and the first cap layer formed from a second material comprising between 0-15% by weight of a first cap filler.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes for selected embodiments and not all possible implementations, and are not intended to limit the scope of the present disclosure.

DETAILED DESCRIPTION

Figure 1:
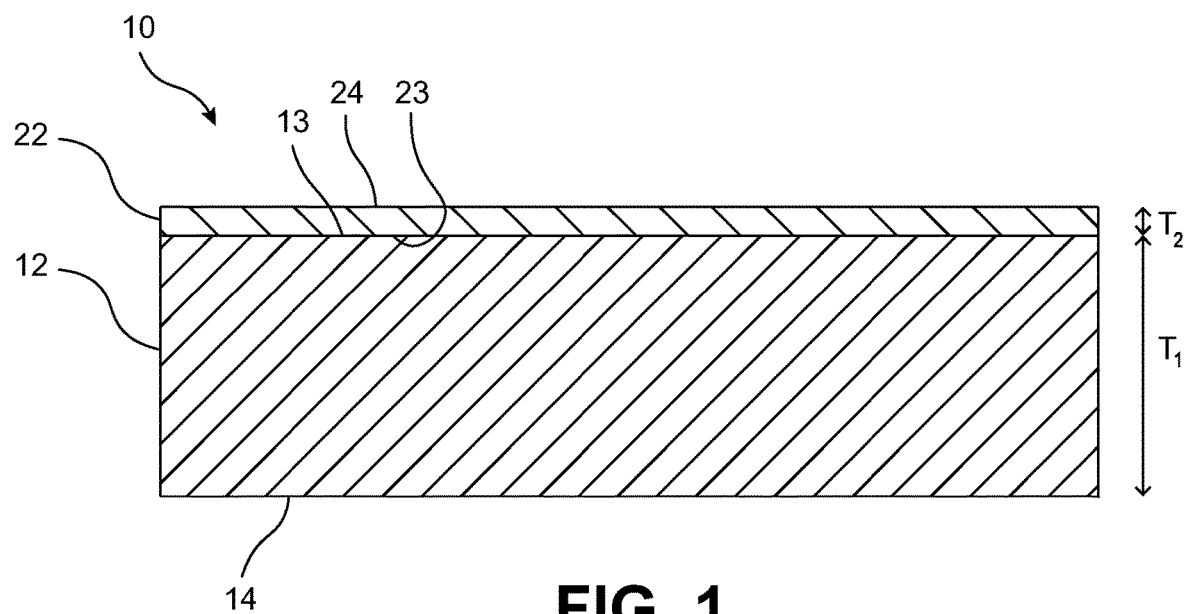
FIG. 1 is a cross-sectional elevational view of an article including a base layer and a cap layer.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

FIG. 1 illustrates an article 10 according to an embodiment of the invention. The article 10 comprises a first layer forming a base layer 12 and a second layer forming a first cap layer 22. The base layer 12 and the first cap layer 22 may cooperate to form a laminated structure having a sheet-like appearance including the base layer 12 extending substantially parallel to and abutting the first cap layer 22 along a length of the article 10. The base layer 12 includes a first major surface 13 and an oppositely arranged second major surface 14 while the first cap layer 22 includes an inner surface 23 and an oppositely arranged outer surface 24. The inner surface 23 of the first cap layer 22 is configured for abutment with the first major surface of the base layer 12 while the outer surface 24 of the first cap layer 22 is configured to provide an exterior surface of the article 10 configured for exposure to the ambient environment.

The base layer 12 is formed from a first material. The first material is a composite including a blend of various constituent materials. The first material may include a blend of at least one polymer and at least one filler. One of the polymers forming the first material may be a thermoplastic polymer. The thermoplastic polymer may be a polyolefin such as polypropylene (PP), polyethylene (PE), or block copolymer polypropylene (BCPP), as non-limiting examples. The thermoplastic polymer may alternatively be a co-polymer of two or more polyolefins such as a copolymer comprising both polypropylene and polyethylene as one non-limiting example. The first material may further include a second polymer in the form of an elastomer. The elastomer may be ethylene propylene rubber (EPR), ethylene propylene diene monomer (EPDM), ethylene-octene (EO), ethylbenzene (EB), styrene ethylene butadiene styrene (SEBS), or copolymers thereof, as non-limiting examples. The at least one filler may be formed from an inorganic solid such as talc, fiberglass, calcium carbonate, carbon fiber, wollastonite, metal oxy sulfate, or combinations thereof, as non-limiting examples.

The at least one filler may be provided in the first material for altering a variety of characteristics of the first material. Generally, the at least one filler may be added to the first material for modifying or enhancing a specific property of the first material, for reducing a cost of the first material, or for improving or better controlling a production process of the first material. More specifically, the at least one filler may be suited for altering at least one of a tensile strength of the first material, a flexural modulus thereof, a heat-deflection temperature thereof, a combustibility thereof, a flexibility thereof, a transparency thereof, a thermal expansion thereof, a thermal stability thereof, a melt flow property thereof, and a tendency of the first material to undergo shrinkage or warpage. The at least one filler may alternatively be provided to reduce a cost of the first material by providing a more cost effective material (the filler) in place of a more expensive material (the at least one polymer). The at least one filler may be substantially evenly distributed throughout the first material and may take the form of a plurality of ribbons, fibers, flakes, platelets, spheres, irregularly shaped particulates, or combinations thereof, as non-limiting examples.

The first material may comprise at least 15% by weight of the at least one filler. In some embodiments, the first material includes between 20-35% by weight of the at least one filler. In other embodiments, the first material may include greater than 35% by weight of the at least one filler. For clarity, it is understood that when more than one filler is used for forming the first material that the given percentage by weight of the at least one filler present within the first material refers to a combined weight of all fillers utilized in the first material and not to a weight of each respective filler present within the first material. For example, if the first material includes a first filler comprising about 20% by weight of the first material and a second filler comprising about 15% by weight of the first material, the first material is referred to as including about 35% by weight of the at least one filler.

The first material may further include additional additives or concentrates suitable for providing additional characteristics to the first material such as a desired color, a desired colorfastness, or a desired resistance to thermal or ultraviolet degradation, as non-limiting examples. As described herein, it is understood that the term "filler" does not refer to such concentrates or additives used primarily for altering the appearance of the first material. Instead, the term "filler" refers only to those inorganic solids used for altering the physical characteristics of a material such as the strength, ductility, density, etc.

In some embodiments, the first material forming the base layer 12 may be formed from a thermoplastic olefin (TPO), wherein a thermoplastic olefin refers to a composite including a blend of at least one thermoplastic polymer, at least one elastomer, and at least one filler. As discussed hereinabove, the TPO forming the first material may comprise at least about 15% by weight of the at least one filler, and in particular between about 20-35% by weight of the at least one filler. The TPO may include any suitable percentage by weight of the at least one thermoplastic polymer, the at least one elastomer, and any additional additives or concentrates added to the first material without departing from the scope of the present invention.

The first cap layer 22 is formed from a second material. The second material may be a composite including a blend of various constituent materials or the second material may be formed by a single material, as desired. In some embodiments, the second material includes a blend of at least one polymer and at least one filler. One of the polymers forming the second material may be a thermoplastic polymer. The thermoplastic polymer may be a polyolefin such as polypropylene (PP), polyethylene (PE), or block copolymer polypropylene (BCPP), as non-limiting examples. The thermoplastic polymer may alternatively be a co-polymer of two or more polyolefins such as a copolymer comprising both polypropylene and polyethylene, as one non-limiting example. The at least one polymer may further include an elastomer. The elastomer may be ethylene propylene rubber (EPR), ethylene propylene diene monomer (EPDM), ethylene-octene (EO), ethylbenzene (EB), styrene ethylene butadiene styrene (SEBS), or copolymers thereof, as non-limiting examples. The at least one filler may be formed from an inorganic solid such as talc, fiberglass, calcium carbonate, carbon fiber, wollastonite, metal oxy sulfate, or combinations thereof, as non-limiting examples.

The at least one filler may be provided in the second material for altering a variety of different characteristics of the second material in similar fashion to those discussed hereinabove with reference to the at least one filler of the first material. The at least one filler may be substantially evenly distributed throughout the second material and may take the form of a plurality of ribbons, fibers, flakes, platelets, spheres, or irregularly shaped particulates, as non-limiting examples. The second material comprises less than about 15% by weight of the at least one filler. In some embodiments, the second material is entirely devoid of the at least one filler and comprises only the at least one polymer. In other embodiments, the second material includes less than 10% by weight of the at least one filler.

The second material may further include additives or concentrates for affecting additional characteristics of the second material such as producing a second material having a desired color, a desired colorfastness, or a desired resistance to thermal or ultraviolet degradation, as non-limiting examples. As discussed hereinabove, such additives or concentrates for affecting the appearance of the second material are not considered "fillers" as referred to in this document.

In some embodiments, the base layer 12 and the first cap layer 22 may include the same filler or fillers. In other embodiments, the base layer 12 includes at least one filler different from the at least one filler present in the first cap layer 22. Each of the fillers present in the base layer 12 may be referred to hereinafter as the at least one "base filler" while each of the fillers present in the first cap layer 22 may be referred to hereinafter as the at least one "first cap filler" in order to differentiate the at least one filler of the base layer 12 from the at least one filler of the first cap layer 22, and especially in circumstances wherein the base layer 12 and the first cap layer 22 include at least one different type of filler. One skilled in the art should appreciate that various different combinations of fillers may be used in the base layer 12 and the first cap layer 22 for providing desired characteristics of the resulting article 10 without departing from the scope of the present invention.

Referring again to FIG. 1, the base layer 12 has a first thickness $T_1$ measured in a stacking direction of the article 10 while the cap layer 22 has a second thickness $T_2$ measured in the stacking direction, wherein the second thickness $T_2$ is less than the first thickness $T_1$. The second thickness $T_2$ of the first cap layer 22 may, for example, be about 10% or less of the first thickness $T_1$ of the base layer 12.

The present technology is specifically drawn towards articles including the first material forming the base layer 12 having greater than 15% by weight of the at least one base filler and the second material forming the first cap layer 22 having less than 15% by weight of the at least one first cap filler. As one example, the base layer 12 may be formed from TPO comprising between about 20-35% by weight of at least one base filler while the first cap layer 22 may be formed from a blend including at least one polyolefin and at least one first cap filler, wherein the second material comprises less than about 15% by weight of the at least one first cap filler. As another example, the base layer 12 may be formed from the TPO comprising between about 20-35% by weight of the at least one base filler while the first cap layer 22 may be formed from at least one polyolefin in the absence of any filler.

The formation of an article 10 including a base layer 12 and a first cap layer 22 as described hereinabove provides the advantage of minimizing weathering and whitening appearance changes on an exposed surface of the article 10 such as the outer surface 24 of the first cap layer 22. This is unlike commonly used TPOs devoid of a first cap layer 22 and having inorganic fillers exceeding 15% by weight of the TPO (and especially between 20-35% by weight of the TPO), which causes the exposed surfaces of the article formed from the TPO to experience a phenomenon described as "whitening." The whitening of the exposed surfaces includes a high Delta E color change in the exposed surfaces, with the change most notably taking place in the Delta L* range. The occurrence of whitening on the exposed surfaces of the TPO appears to be similar to the effects of UV degradation even when the TPO and any constituent color concentrates included therein have sufficient UV stabilization properties.

Although not wishing to be bound by theory, it is believed that the observed whitening in commonly used TPOs can be caused in part by thermal degradation of an exposed surface of the TPO, thereby leaving or enriching the inorganic fillers present within the TPO. These inorganic fillers may become visually exposed over time due to exposure of the article to the elements; e.g., outdoor use, testing using an accelerated weatherometer, heat aging, etc. Inorganic materials suitable for use as fillers are often white or similar light colors, causing an undesirable and premature look of whitening to the article when the inorganic fillers are visually exposed due to degradation of the outer surface of the TPO.

Specifically, it has been found that articles manufactured in a thermoforming process are especially susceptible to such an effect in comparison to articles formed by extrusion or injection molding in the absence of a subsequent thermoforming processing step. It is believed that radiant heat provided during a thermoforming process effectively volatilizes or "cooks off" a certain amount of a surface layer of the article, thereby leaving or enriching the inorganic fillers present within the TPO to be exposed to a greater extent. Continued exposure to the elements can allow the filler (e.g., talc) rich surface to further whiten over time.

The present technology effectively addresses the issue of whitening by disposing an unfilled or minimally filled (e.g., <15% by weight) first cap layer 22 on a surface of the base layer 12, where the first cap layer 22 may be about 10% or less of the overall thickness of the resulting article 10. Because the first cap layer 22 has little-to-no filler present therein, the first cap layer 22 leaves little to no inorganic fillers at the outer surface of the article 10, even following a thermoforming process capable of potentially volatilizing or "cooking off" some of the outer surface 24 of the first cap layer 22.

The overlaying first cap layer 22 can also be prepared in various colors and thereby maintain a particular color and gloss condition on the exposed surface of the resulting article 10. As such, the underlying base layer 12 may be produced to be uncolored or black, thereby reducing the need for additional additives or concentrates within the base layer 12 for altering an appearance of the base layer 12. For example, various additives or concentrates specifically related to a color, a color fastness, or a gloss of the base layer 12 may be reduced or avoided entirely when the first cap layer 22 is present over the base layer 12.

It has been discovered that the issue of whitening as described hereinabove may not be as prevalent when the exposed surfaces of the article are formed to have a relatively high-gloss rating. However, it is often not desirable in many applications for an outer surface of the resulting article to include a relatively high gloss rating based on factors such as an appearance of the article, a texture of the article, and the like. As such, the present technology may include the second material of the first cap layer 22 being selected to have a gloss within a desired range based on the type of manufacturing process used in forming the resulting article 10. For example, the second material may be selected wherein the outer surface 24 of the first cap layer 22 has a gloss ranging from 0.1-70% on a 60 degree angle Gardner Gloss meter following a co-extrusion process for forming the base layer 12 and the first cap layer 22. The second material may further be selected wherein the outer surface 24 of the first cap layer has a gloss ranging from 1-65% on the 60 degree angle Gardner Gloss meter following a subsequent thermoforming process of the base layer 12 and the first cap layer 22.

Figure 2:
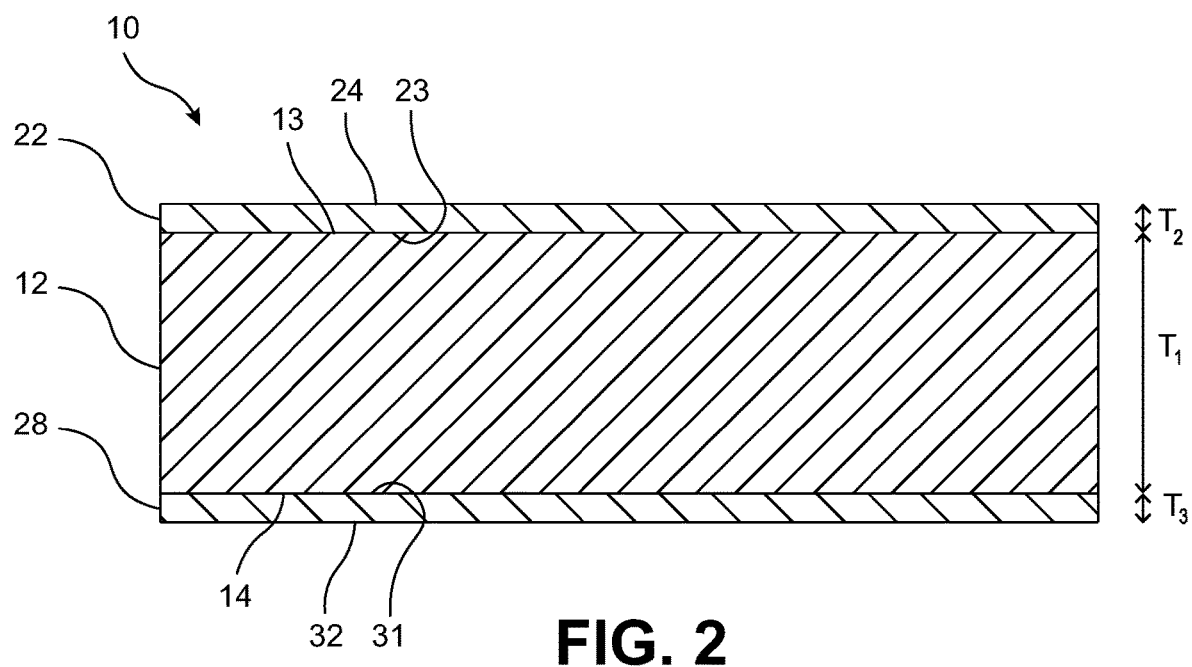
FIG. 2 is a cross-sectional elevational view of an article including a base layer and a pair of oppositely formed cap layers.

Referring now to FIG. 2, the article 10 may optionally further include a second cap layer 28. The second cap layer 28 includes an inner surface 31 abutting the second major surface 14 of the base layer 12 and an outer surface 32 formed opposite the inner surface 31. The second cap layer 28 is subject to the same limitations as discussed hereinabove with reference to the first cap layer 22. More specifically, the second cap layer 28 is formed from a third material including at least one polymer and optionally including at least one filler comprising less than about 15% by weight of the second cap layer 28. The third material is additionally subject to the same limitations described hereinabove regarding a gloss of the outer surface 32 of the second cap layer 28 following either of an extrusion process or a subsequent thermoforming process. Hereinafter, each of the fillers present in the third material forming the second cap layer 28 may be referred to as the at least one "second cap filler" to differentiate each of the fillers present in the second cap layer 28 from the fillers present in either of the base layer 12 or the first cap layer 22. The at least one polymer and the optional at least one second cap filler forming the second cap layer 28 may be selected from the same materials presented hereinabove with reference to the first cap layer 22. The second cap layer 28 may include a third thickness $T_3$ measured in the stacking direction of the article 10, wherein the third thickness $T_3$ is less than the first thickness $T_1$. The third thickness $T_3$ of the second cap layer 28 may, for example, be 10% or less of the first thickness $T_1$ of the base layer 12. The third thickness $T_3$ of the second cap layer 28 may be the same or different from the second thickness $T_2$ of the first cap layer 22, as desired.

In some embodiments, the second material of the first cap layer 22 and the third material of the second cap layer 28 may be the same material such as a blend of at least one polyolefin and at least one filler forming less than about 15% by weight of each of the first cap layer 22 and the second cap layer 28, respectively. In other embodiments, the first cap layer 22 includes the at least one first cap filler at less than about 15% by weight while the second cap layer 28 is entirely devoid of a filler. In still other embodiments, the first cap layer 22 may include a first percentage by weight of the at least one first cap filler while the second cap layer 28 includes a second percentage by weight of the at least one second cap filler, wherein the first and second percentages are different and range between 0-15%. In yet another embodiment, the first cap layer 22 includes a first polyolefin such as polypropylene, while the second cap layer 28 includes a second and different polyolefin, such as polyethylene. The first cap layer 22 may include a first cap filler such as talc, while the second cap layer may include a second and different cap filler such as fiberglass, for example. One skilled in the art should appreciate that any combination of polymers and fillers may be used to form the first cap layer 22 and the second cap layer 28 in accordance with the limitations set forth hereinabove with reference to the materials forming either of the first cap layer 22 or the second cap layer 28, so long as each of the cap layers 22, 28 include less than about 15% by weight of the at least one associated filler for preventing the incidence of whitening described hereinabove.

Structural characteristics of the resulting article 10 can be tailored in various ways by modification of the materials used for each of the layers 12, 22, 28. For example, maintaining each of the cap layers 22, 28 at a thickness about 10% of a thickness of the base layer 12 can maintain a desired structural rigidity or stiffness of the article 10. Likewise, the filler content of the base layer 12 can be increased from greater than about 15% by weight to from about 20-35% by weight or greater to achieve a desired structural rigidity or stiffness of the article 10. In such a circumstance, the overlaying cap layers 22, 28 can be formed to include high-strength and/or high-density polyolefins to offset the absence or minimal amount of filler present therein in comparison to the base layer 12 having the increased filler content.

The article 10 may be formed by a co-extrusion process, wherein a co-extrusion process refers to a process wherein more than one material is extruded simultaneously. For example, with reference to FIG. 3, a co-extrusion system 100 is schematically disclosed for forming the article 10 having each of the base layer 12, the first cap layer 22, and the second cap layer 28. The co-extrusion system 100 includes a first extruder 101 for melting the first material of the base layer 12, a second extruder 102 for melting the second material of the first cap layer 22, and a third extruder 103 for melting the third material of the second cap layer 28. The co-extrusion system 100 further includes an extrusion die head 105 in fluid communication with each of the extruders 101, 102, 103. The extrusion die head 105 receives the melted materials from each of the respective extruders 101, 102, 103 and then extrudes the article 10 as a laminated sheet 110 comprising the base layer 12, the first cap layer 22, and the second cap layer 28. The laminated sheet 110 may then be cut to any desired shape and size for further processing of the laminated sheet 110. The co-extrusion system can also be used to similarly form the article 10 having the base layer 12 and the first cap layer 22.

The extrusion die head 105 is configured to extrude each of the layers 12, 22, 28 of the laminated sheet 110 to have a desired cross-sectional shape and size. For example, the extrusion die head 105 illustrated in FIG. 3 may be configured to extrude each of the layers 12, 22, 28 to have a substantially rectangular cross-sectional shape, wherein each of the layers 12, 22, 28 includes substantially the same width while having the variable thicknesses $T_1$, $T_2$, and $T_3$.

Figure 3:
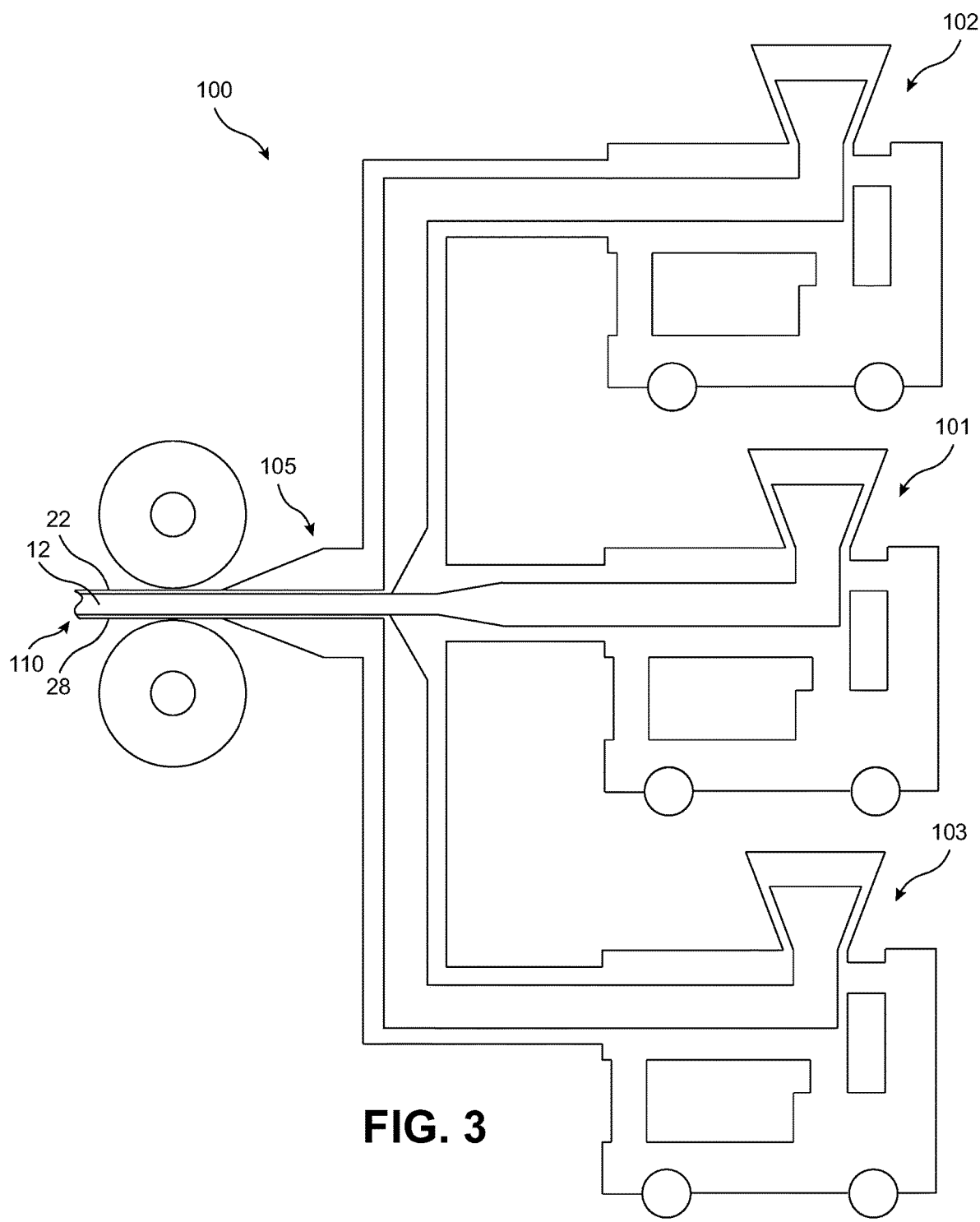
FIG. 3 is a schematic illustration of a co-extrusion process for forming the articles of FIGS. 1 and 2.

It should also be understood that the extrusion die head 105 may be configured for extruding any suitable cross-sectional shape or configuration in addition to the laminated sheet 110 disclosed in FIG. 3. For example, the extrusion die head 105 may be configured to extrude the base layer 12 as a cylindrical cross-sectional shape or pipe, wherein the first cap layer 22 is disposed on an outer surface of the cylindrical shape and wherein the second cap layer 28 is disposed on an inner surface of the cylindrical shape. One skilled in the art should appreciate that the extrusion die head 105 may be configured in a manner wherein the first and second cap layers 22, 28 preferably form exterior surfaces of the resulting article for exposure to the ambient environment, regardless of the cross-sectional shape of the extruded article.

It has been discovered that the use of each of the first cap layer 22 and the second cap layer 28 to encapsulate the centrally disposed base layer 12 also tends to reduce an incidence of "die lip buildup" when the different layers are formed in a co-extrusion process such as that described hereinabove. This occurs because each of the exteriorly disposed cap layers 22, 28 is formed from a material that tends to experience reduced deposition thereof at the extrusion die head exit in comparison to the materials suitable for forming the interiorly disposed base layer 12. As a result, the inclusion of the second cap layer 28 in addition to the first cap layer 22 may increase a speed of producing the article 10 by reducing an occurrence of maintenance to the extrusion die head.

It should further be understood that the co-extrusion system 100 shown in FIG. 3 may be adapted for co-extruding only a single one of the cap layers 22, 28 onto the base layer 12, as desired. The article 10 may be formed to have only one of the cap layers 22, 28 if the article 10 normally includes surfaces that will not be exposed to the ambient environment in a manner that may lead to whitening, or if the article includes surfaces wherein a visual appearance of the surfaces is not relevant to use of the article 10, as non-limiting examples. Such a co-extrusion process would accordingly be carried out using only the first and second extruders 101, 102 of the co-extrusion system 100, for example.

In some circumstances, the article 10 may be further processed following the co-extrusion process disclosed hereinabove. In other circumstances, the article 10 formed by the co-extrusion process may be further modified subsequent to the co-extrusion process for producing a desired final article. For example, the article 10 produced by the co-extrusion process may subsequently be subjected to a thermoforming process for further modifying a shape and configuration thereof. The thermoforming process may be a vacuum thermoforming process, a pressure thermoforming process, or a mechanical thermoforming process, as desired.

Figure 4:
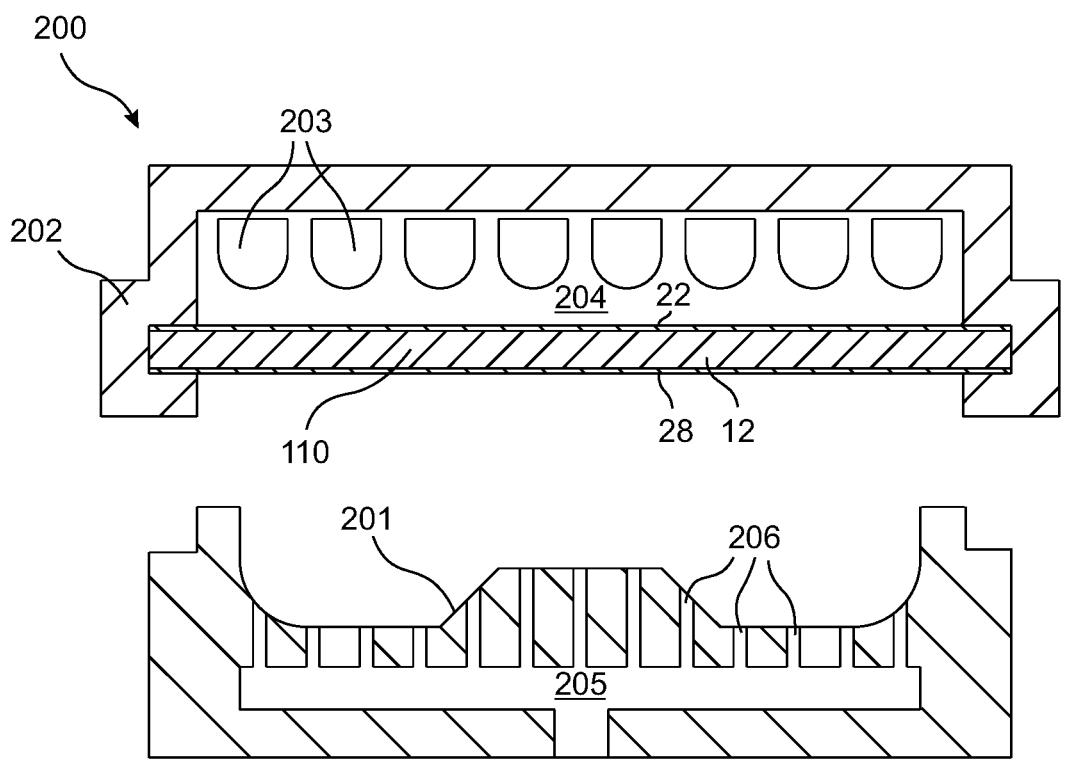
FIG. 4 is a cross-sectional elevational view of a thermoforming system for post-processing an article, wherein the thermoforming system is shown during a heating step and prior to a deforming of the article.
Figure 5:
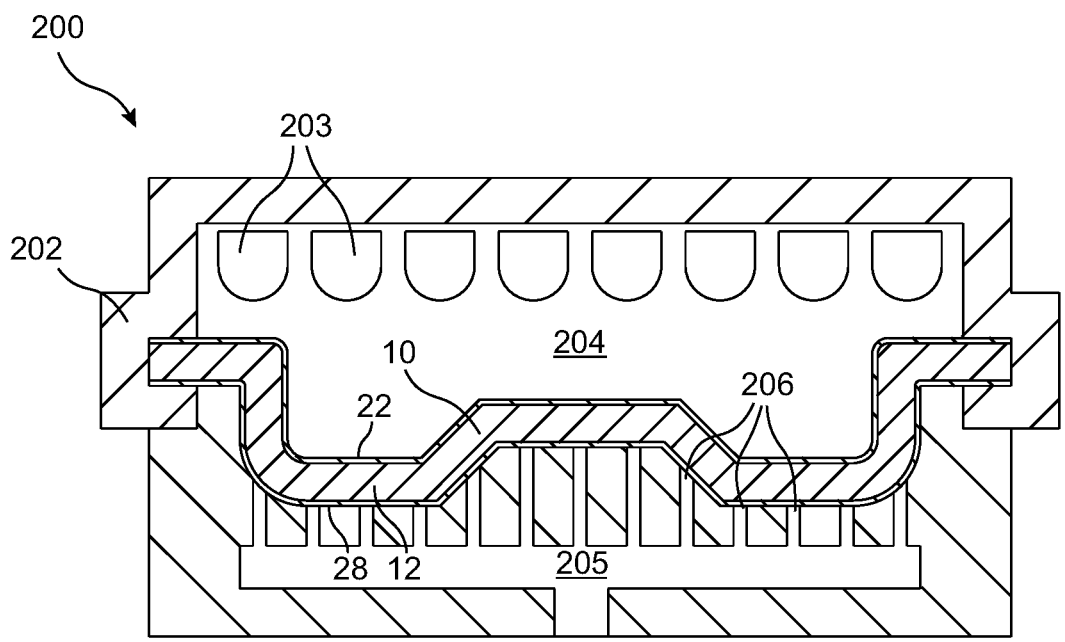
FIG. 5 is a cross-sectional elevational view of the thermoforming system of FIG. 4 showing a deforming of the article during a thermoforming process.

FIGS. 4 and 5 illustrate a thermoforming system 200 for performing a thermoforming process on one of the articles 10, wherein the article 10 may be formed as the laminated sheet 110 as disclosed with reference to FIG. 3. The thermoforming system 200 shown may be suitable for a vacuum thermoforming process or a pressure thermoforming process. The thermoforming system 200 includes a mold 201, a clamp 202, a heating element 203, a high pressure chamber 204, a low pressure chamber 205, and a plurality of openings 206 providing fluid communication between the high pressure chamber 204 and the low pressure chamber 205.

In use, the laminated sheet 110 is secured by the clamp 202 and heated by the heating element 203 (FIG. 4) to soften the laminated sheet 110 to a suitable degree for deforming the laminated sheet 110 into a desired shape. Once adequately heated, the laminated sheet 110 may then be positioned adjacent the mold 201 (FIG. 5) while still secured by the clamp 202. A pressure difference is then generated between the high pressure chamber 204 and the low pressure chamber 205, wherein the pressure difference may be generated by forming a vacuum pressure within a fluid disposed within the low pressure chamber 205, by introducing a compressed fluid into the high pressure chamber 204, or a combination of the two. The pressure difference generated between the high pressure chamber 204 and the low pressure chamber 205 causes the laminated sheet 110 to deform and abut the mold 201 and conform to a shape of the mold 201, while any fluid present between the laminated sheet 110 and the mold 201 is discharged through the openings 206 and subsequently the low pressure chamber 205.

The thermoforming process results in an article 10 having a desired shape and configuration, including the potential for highly irregular shapes with various indentations, protrusions, rounded surfaces, and the like. As explained above, the addition of one or more of the cap layers 22, 28 to the base layer 12 prevents an incidence of visual whitening of an exterior surface of the thermoformed article 10 by including the whitening resistant cap layers 22, 28 as the outermost layers of the thermoformed article 10. This is in contrast to an article having a relatively high content of the at least filler and formed in the absence of the cap layers, as such an article may be subject to thermal degradation and exposure of the at least one filler during the heating and forming of the article during the thermoforming process.

It should be appreciated by one skilled in the art that the article 10 may be formed by any known manufacturing process in addition to those described hereinabove, as desired, so long as one of the cap layers 22, 28 having the reduced filler content is disposed on the base layer 12 having the relatively high filler content. For example, the article 10 may be formed by a multi-material injection molding process wherein the second and/or third materials forming the cap layers 22, 28 are disposed exterior to the first material forming the base layer 12.

The present technology therefore provides certain benefits and advantages, including resolving the whitening issue present in materials having a relatively high filler content, reducing costs by eliminating the need for additional film cap or paint layers, and reducing quality issues and running downtime due to die lip build-up present during co-extrusion processes.

Example embodiments are provided so that this disclosure is thorough, and fully conveys the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An article comprising:
   a base layer formed from a first material, wherein the first material is a thermoplastic olefin comprising a thermoplastic polymer, an elastomer, and greater than 15% by weight of a base filler; and
   a first cap layer disposed on the base layer, the first cap layer formed from a second material comprising a thermoplastic polymer and between 0.1-15% by weight of a first cap filler formed from an inorganic solid, wherein the first cap layer includes an outer surface having a gloss ranging from 0.1-70% on a 60 degree angle Gardner Gloss meter.

2. The article of claim 1, wherein the base layer has a first thickness and the first cap layer has a second thickness, wherein the second thickness is 10% or less of the first thickness.

3. The article of claim 1, wherein the base layer and the first cap layer are formed as a laminated sheet in a co-extrusion process.

4. The article of claim 3, wherein the article is formed by thermoforming the laminated sheet.

5. The article of claim 4, wherein the first cap layer includes an outer surface having a gloss ranging from 1-65% on a 60 degree angle Gardner Gloss meter.

6. The article of claim 1, wherein the base filler and the first cap filler are the same material.

7. The article of claim 1, wherein the thermoplastic polymer of the second material is one of polyethylene, polypropylene, or a co-polymer of polyethylene and polypropylene.

8. The article of claim 1, wherein the first material comprises between 20-35% by weight of the base filler.

9. The article of claim 1, further comprising a second cap layer disposed on the base layer and formed from a third material, the third material comprising between 0-15% by weight of a second cap filler, wherein the base layer is disposed between the first cap layer and the second cap layer.

10. The article of claim 1, wherein the base filler is formed from an inorganic solid.

11. The article of claim 10, wherein the base filler and the first cap filler are selected from a group comprising talc, fiberglass, calcium carbonate, carbon fiber, wollastonite, and metal oxy sulfate.

12. The article of claim 1, wherein the gloss is formed after the base layer and first cap layer are formed.

13. An article comprising:
   a base layer formed from a thermoplastic olefin comprising a thermoplastic polymer, an elastomer, and a base filler, the base layer comprising greater than 15% by weight of the base filler, the base layer having a first thickness; and
   a first cap layer disposed on the base layer, the first cap layer comprising a polyolefin and between 0.1-15% by weight of a first cap filler formed from an inorganic solid, the first cap layer having a second thickness less than the first thickness, wherein the base layer and the first cap layer are formed in a co-extrusion process, wherein the first cap layer includes an outer surface having a gloss ranging from 0.1-29% on a 60 degree angle Gardner Gloss meter.

14. The article of claim 13, wherein the gloss forms on the outer surface of the first cap layer post forming of the base layer and first cap layer.

15. An article comprising:
   a base layer formed from a thermoplastic olefin comprising a thermoplastic polymer, an elastomer, and a base filler, the base layer comprising between about 20-35% by weight of the base filler, the base layer having a first thickness; and
   a first cap layer disposed on the base layer, the first cap layer comprising a polyolefin and between 0.1-15% by weight of a first cap filler, the first cap layer having a second thickness less than the first thickness, wherein the base layer and the first cap layer are formed in a thermoforming process, wherein the first cap layer includes an outer surface having a gloss ranging from 0.1-29% on a 60 degree angle Gardner Gloss meter, and wherein the second thickness is 10% or less of the first thickness, wherein the base filler and the first cap filler are each formed from an inorganic solid.

16. The article of claim 15, wherein the first cap layer comprises between 0.1-10% by weight of the first cap filler.

17. The article of claim 15, wherein the base layer is uncolored.

18. The article of 15, wherein the gloss forms on the outer surface of the first cap layer after the thermoforming process.

\* \* \* \* \*